Aug. 10, 1943.  T. J. SMULSKI  2,326,402
WINDSHIELD WIPER ARM
Filed March 10, 1941  2 Sheets-Sheet 1
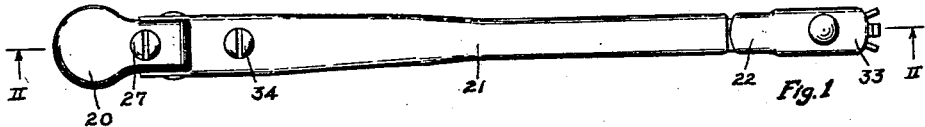
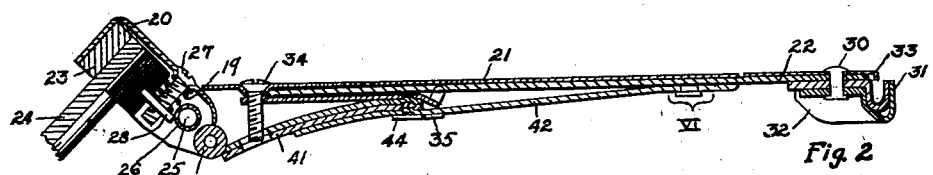
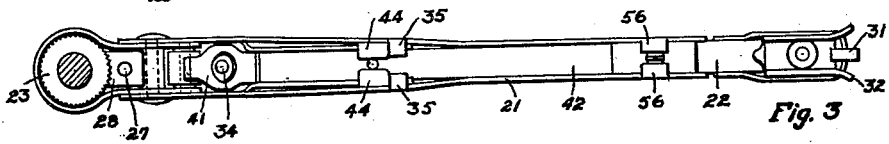
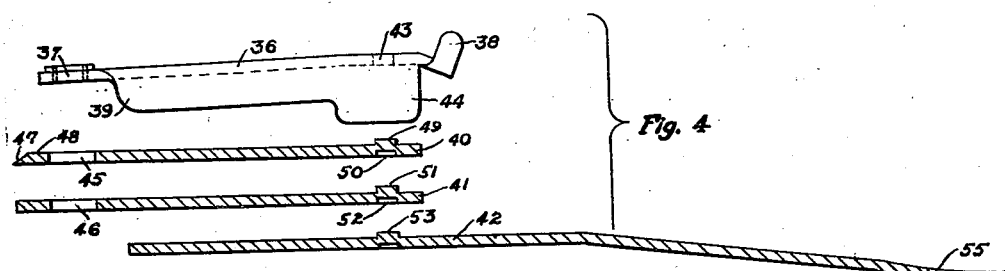
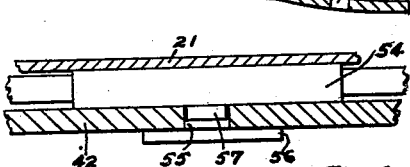
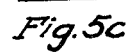
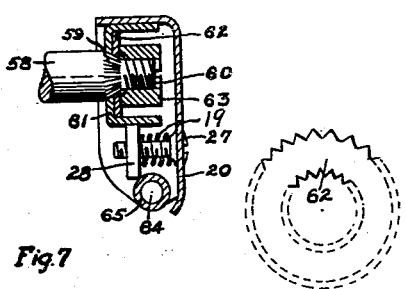
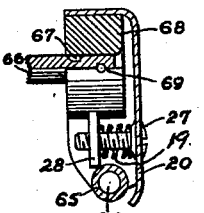
INVENTOR
Theodore J. Smulski
BY Alois W. Graf
ATTORNEY Aug. 10, 1943.　　　T. J. SMULSKI　　　2,326,402
WINDSHIELD WIPER ARM
Filed March 10, 1941　　　2 Sheets-Sheet 2

INVENTOR
Theodore J. Smulski
BY Alois W. Graf
ATTORNEY

Patented Aug. 10, 1943

2,326,402

UNITED STATES PATENT OFFICE 2,326,402

WINDSHIELD WIPER ARM

Theodore J. Smulski, Gary, Ind., assignor to Productive Inventions, Inc., a corporation of Indiana Application March 10, 1941, Serial No. 382,503

20 Claims. (Cl. 15—255)

My invention relates to windshield wiper arms and more particularly to multi-section arms which are suited for the replacement of various different original equipment windshield wiper arms.

Each year when the automobile manufacturers announce new models of automobiles, numerous new shapes and sizes of windshield wiper arms appear on these automobiles as original equipment. This has increased the number of different arms so greatly that the automobile service stations find it an economic burden to attempt to carry an exact replacement arm for every arm still in use. Certain automobile manufacturers have also recognized that it is highly desirable if their authorized automobile dealers and service stations would have available a suitable windshield wiper arm which could be used for the replacement of worn or defective original equipment without the disadvantage of a large inventory and the inconvenience encountered when the stock of the dealer or authorized service station does not have a particular windshield wiper arm.

It is, therefore, an object of this invention to provide an improved windshield wiper arm which will overcome the above mentioned disadvantages and which will be simple and reliable in operation.

It is another object of this invention to provide a windshield wiper arm which may be readily attached to the various different types of shaft members of windshield wiper mechanisms.

It is a further object of this invention to provide an improved windshield wiper arm which is extensible to match any desired arm length, and which is provided with an arrangement for adjusting the tension of the arm to provide proper operation.

Still another object of this invention is to provide an improved windshield wiper arm wherein the attaching fastening means are readily accessible from the front of the arm and are operable without the use of special tools.

Still another object of this invention is to provide a new and improved windshield wiper arm which may be swung or moved away from the windshield together with the wiping element and resiliently retained in such position to provide free and unobstructed access to the surface of the windshield for washing or cleaning.

For a better understanding of this invention together with further objects and advantages thereof, reference is had to the following description taken in connection with the accompanying drawings in which—

Figure 1 is a top view of the wiper arm in the normal operative position;

Figure 2 is a cross-sectional view of the arm of Figure 1 when the arm is in a position moved away from the windshield;

Figure 3 is a bottom view of the wiper arm;

Figure 4 is an exploded view of the adjustable tension leaf spring assembly of the wiper arm;

Figure 10:
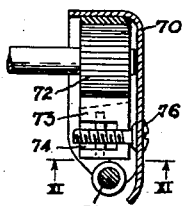
Figure 11:
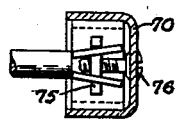

Figures 5a, 5b, and 5c comprise top, side and end views of one of the parts of the wiper arm;

Figure 6 is an enlarged view of a portion VI of the arm of Figure 2, showing the arrangement for permitting extensible adjustment of the arm and for retaining such adjustment in position;

Figure 7 is a cross-sectional view showing how the inner section of the arm is attached to a different type windshield wiper shaft member;

Figure 8 illustrates the construction of a portion of the assembly of Figure 7;

Figure 9 is another view showing how the inner section of the arm is attached to another type of shaft member of a windshield wiper mechanism;

Figure 10 is a cross-sectional view which shows a modified form of attachment means supported by the inner section of a wiper arm;

Figure 11 is a cross-sectional view of Figure 10 along the lines XI—XI; and

Figure 12:
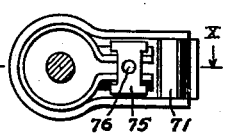
Figure 13:
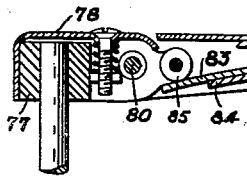
Figure 15:
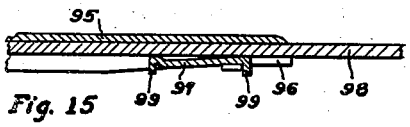
Figure 14:
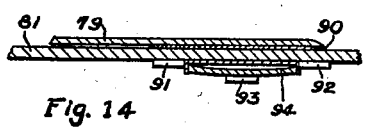
Figure 16:
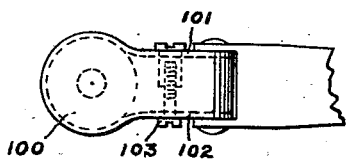

Figure 12 is a view from the inside of the inner section of the wiper arm attachment arrangement shown in Figure 10;

Figure 13 shows a wiper arm embodying certain modifications of this invention; and Figure 14 is an enlarged view of a portion of Figure 13;

Figure 15 illustrates another manner of retaining the adjustable portions of the arm in position;

Figure 16 illustrates another modification of a manner of attaching the inner sections of wiper arms to the shaft members of windshield wiper mechanisms.

Referring to Figures 1, 2 and 3 of the drawings, I have shown therein a windshield wiper arm having an inner section 20, an intermediate section 21 which is pivotally mounted on the inner section and an outer section 22 which is mounted on and longitudinally adjustable with respect to the intermediate section 21. The inner section 20 is provided with means for securing the section to the shaft member 23 of a windshield wiper mechanism. This shaft member 23 in some instances is an enlarged member having a serrated surface, and it is securely fastened to a smaller shaft 24. The outer surface of the shaft member 23 is frictionally secured to the inner section of the wiper arm. The intermediate section 21 which is preferably of channel like formation is pivotally mounted upon the inner section 20 by means of a pivot pin 25 which preferably is surrounded by a sleeve 26, the purpose of which presently will become apparent. A screw member 27, which is accessible from the top of the inner section 20 supports a wedge member 28 having a concave surface, which may be serrated, on one side; and on the opposite side a smooth surface which engages the thrust surface of the pivot pin 25 or the sleeve 26 to cause the concave surface of the wedge to be thrust against the surface of the shaft member 23 upon actuation of the screw 27. It has been found preferable, in order to retain the screw member 27 and the wedge member 28 in easy readily operative relation to each other, to surround the screw member 27 with a coil spring 19 bearing against the wedge member and the inner surface of the inner arm section 20. The inner section 20 is furthermore provided with a contact member 29 which is engaged by a spring member mounted upon the inner section 21 to bias the remaining sections of the wiping arm toward or away from the windshield.

An outer section 22 is mounted on and longitudinally adjustable with respect to the inner section 21 which has a portion of the channel adjacent its end tapered inwardly to form a guide for the outer section. The outer section 22 is provided at its free end with a windshield wiper blade attachment means which is pivotally mounted at 30 so as to be angularly positioned to one side or the other relative to section 22 thereby to position the wiper blade in alignment with the edge of the windshield on either the right or left portions of the windshield. This attachment means does not form any part of my invention, but is the invention of John W. Anderson which is described and claimed in an application, Serial No. 282,008, filed June 30, 1939, for a Windshield wiper arm, now Patent No. 2,290,140, which is assigned to the same assignee as the present application. This attachment means may be briefly described as a hook 31 which is supported between a pair of ears on a channel like portion 32 which portion engages the sides of the windshield wiper blade connector. The hook 31, the channel member 32 and a cap 33 are assembled on the outer extremity of the outer section 22 by the pivot rivet 30.

The intermediate section 21 is provided with a spring assembly, the parts of which are shown in exploded relation to each other in Figure 4. This spring assembly is supported on the inner section 21 by a screw adjusting member 34 and inwardly turned portions 35 of the channel like body of the section 21. This spring assembly comprises a lever-like retainer 36 and one or more leaf spring members. The retainer lever 36 is provided at one end with a threaded aperture 37 for cooperation with the screw member 34, and at the opposite end with a pair of rocker portions 38 which engage the underside of the top portion of the channel like body of the intermediate section 21. The retainer member 36 has a channel like portion 39 for receiving a plurality of spring members such as 40, 41 and 42 and which are retained in position by an aperture 43 and an inwardly turned portion or portions 44 of channel like portion 39. The retainer member 36 serves as an adjustment transmitting member for causing the stress of the spring formed by members 40, 41 and 42 to be altered in response to adjustment of the screw adjusting member 34. The spring members 40 and 41 are each provided with suitable apertures 45 and 46 respectively, through which the lower extremity of the screw member 34 may extend without interfering with the operation of the wiper arm. The spring member 40 is provided at one extremity with a pair of surfaces 47 and 48 arranged at angles to each other so that they may selectively be engaged with the contact member 29 of the inner wiper arm section 20. The other extremity of the spring member 40 is provided with a projection 49 which fits into the aperture 48 of the assembly member 36. Directly underneath the projection 49 there is provided an indentation 50 which is adapted to receive the projection 51 on one extremity of the spring member 41. Similarly under the projection 51 of the spring member 41 there is a depression 52 adapted to receive a projection 53 located at an intermediate point of a spring member 42. The leaf spring member 41 assists the spring member 40 in applying a spring bias to the contact member 41 of the inner section 20. A portion of the leaf spring 42 further supplements the bias to be exerted on the inner section, and the remainder of the leaf spring 42 supplies bias to a bearing member 54. Adjacent to one extremity of the spring member 42 there is provided an aperture 55 for receiving a lug member of the bearing sleeve 54 thereby to retain it in position. The bearing member 54 and one extremity of the spring 42 are supported upon turned in ears 56 of the channel like portion of the inner section 21.

The retainer member 36 has rocker portions 38 of such dimensions that the body portion of the retainer 36 is located a short distance from the inner surface of the channel like member of the intermediate section 21. This arrangement permits the outer arm member 22 to be located, when contracted, between the top of the assembly retainer member 36 and the inner surface of the channel like portion of the intermediate section 21. Thus this arrangement adds a considerable amount to the length to which the wiper arm may be extended at the position of greatest extension. It is quite apparent that if this space between the leaf spring assembly member 36 and the inner surface of the channel 21 were not provided, the arm could not be extended over as great a range as is possible in the arrangement shown in Figure 2. Obviously this greatly adds to the universal adaptability of the arm for replacement purposes.

In Figure 2 the wiper arm is shown in a position away from the windshield so that the windshield may be readily cleaned. The arm is resiliently biased in this direction since the contact surface 47 of the leaf spring 40 of the spring assembly is in engagement with the contact member 29 of the inner section 20. When the other contact surface 48 of the spring member 40 is in contact with the contact member 29 of the inner section 20, as illustrated in Figure 3, the spring assembly exerts a bias tending to move the remainder of the wiper arm assembly toward and against the windshield. Since the spring tension or bias thus exerted by the spring assembly bears a certain relation to the length to which the arm has been extended and to the type of wiper blade being utilized, it is desired to adjust the degree of bias to be exerted. This is accomplished by adjusting the screw member 34 which extends through, and is accessible from the front of, the intermediate section 21 thereby moving one end of the spring retainer 36 either away from or toward the inner surface of the channel like portion of the intermediate arm portion 21. The spring retainer member 36 is rockably movable upon the rocker portions 38. The bias to be exerted by the spring assembly may be predetermined, throughout a wide range, by adjustment of the screw member 34.

A portion of the spring member 42 also cooperates in retaining in adjusted position the outer section 22 of the windshield wiper arm. This may be understood by referring to Figures 5 and 6 as well as Figures 2 and 3. Figure 5 illustrates the structure of the split sleeve bearing member 54 which is provided with a lug 57. An enlarged view in Figure 6 of the arm portion VI shown in Figure 2 shows that the lug member 57 of the split-sleeve bearing member 54 is located within the aperture 55 of the spring member 42. The split-sleeve bearing 54 is in effect located between the inner and outer arm sections 21 and 22 and is preferably made of softer metal to provide smooth and easy adjustment of the parts relative to each other. By virtue of the split construction of the sleeve member 54, the pressure of the ears 56 is applied to the longitudinally adjustable member 22 and operates to hold the outer member 22 frictionally in adjusted position.

In Figure 7 there is shown the inner section 20 of the windshield wiper arm attached to a shaft member 58 of a windshield wiper actuating mechanism. This shaft member 58 is provided with a tapered serrated shoulder 59 and a reduced threaded portion 60. In some wiper mechanism this type of actuating shaft is relatively hard and in other mechanisms it is relatively soft. In order to provide a member which can be mounted on any shaft irrespective of the degree of hardness, an apertured metal cup 61 of soft steel is mounted so that the aperture will engage the serrated shoulder portion 59 of the actuating mechanism. In the event that the shoulder is of relatively softer material it would be desirable to provide a harder material for engagement therewith. To this end there is provided a washer member 62 which has its inner and outer surfaces of serrated formation. The outer serrated edges of the washer 62, which is illustrated in greater detail in Figure 8, engage the inner surfaces of the apertured metal cup 61. Inner serrated surfaces of the washer 62 will bear against the taper shoulder 59. These two members, the cup 61 and the washer 62, are held in fixed engagement with the taper shoulder 59 of the wiper shaft 58 by means of a threaded nut or sleeve 63. The wedge 28 is adjusted by the screw member 27 so as to force the wedge against the cup member 61 so that there is good frictional contact between the inner surface of the wiper arm section 20 and the outer surface of the metal cup 61. The intermediate and outer sections of the wiper arm are mounted upon the pivot pin 64 which has been shown as being provided with a sleeve 65 for engagement with the smooth edge of the wedge member 28.

In some instances the actuating mechanism of a windshield wiper is provided with a shaft of the type illustrated in Figure 9. The shaft 66 supported a wire arm which engaged a hole near the end of the arm and which was retained by a keeper member engaging a groove portion 67 on the shaft 66. In order that the present arm may be used on such shaft a sleeve 68 is secured to the reduced portion of the shaft by means of a pin 69. The wedge 28 in this adjusted position engages the outer surface of the sleeve 68 thereby forcing the greater portion of the sleeve 68 into frictional engagement with the inner surface of the inner arm section 20.

From the description and illustration of the modifications shown in Figures 7 and 9 together with the arrangement shown in Figure 2, it will be apparent that the arm shown in Figures 1, 2 and 3 is universally applicable to the various types of shaft members of windshield wiper mechanisms. Thus substantially all types of wiper mechanisms in use today may be fitted with the present arm.

While there has been shown in Figures 2 and 3 a preferred form of wiper shaft engaging means for the inner section 20 of the windshield wiper arm, another satisfactory arrangement is illustrated in Figures 10 to 12. In this arrangement the inner section 70 of a windshield wiper arm is provided with a pivot 71 to which the other section or sections of the arm are attached. Figure 10 is a cross-sectional view looking in the direction of the lines X—X of Figure 12; and Figure 11 is a cross-sectional view looking in the direction of the lines XI—XI of Figure 10. From these figures it will be seen that the windshield wiper shaft member 72 is embraced by a flexible band 73, the ends of which are arranged at angles to each other and to the plane of the body or circular portion of the band. Each of these ends is provided with a transversely located recess 74 in which there is mounted an actuating member 75. The actuating member 75 is supported by a screw member 76 which is mounted on the inner arm section 70 so as to be operable from the top of the inner section. Since the ends of the band member are arranged at angles to each other it will become apparent that actuation of the member 75 by the screw 76 will tend to draw the ends of the band 75 together thereby securely embracing the wiper shaft member 72. While this band member has been illustrated as embracing the shaft member of the type having a serrated edge, it of course will be apparent to those skilled in the art that the band member will be capable of securely fastening the arm to windshield wiper actuated shafts which have been prepared with adaptor mechanisms similar to those illustrated in Figures 7 to 9.

A further modification of some of the features of this invention are illustrated in Figures 13 and 14, wherein the shaft member 77 of the windshield wiper mechanism is embraced by a wedge and screw member mounted within an inner arm section 78 similar to the arrangement illustrated in Figures 2 and 3. An intermediate arm section 79 is pivotally mounted upon a pivot pin 80 located upon the inner section 78. An outer section 81 is mounted on and longitudinally adjustable with respect to the intermediate section 79. The inner section 78 is provided with a spring assembly comprising a retainer member 82 which supports a plurality of leaf spring members such as 83 and 84, at least one of which engages a contact member 85 mounted adjacent one end of the inner section 78. The leaf spring retainer member 82 is of channel like formation having rocker portions 86 which engage the inner side of the channel like formation of the intermediate section 79. Adjacent one end of the retainer member there is a threaded aperture 87 which is engaged by a screw member 88 mounted upon an inwardly bent portion of the intermediate channel section 79. The spring assembly retainer 82 is furthermore supported from the intermediate channel section 79 by one or more inwardly bent portions 89 of the channel. An adjustment of the screw member 88 changes the position of the spring retainer 82 with respect to the intermediate section 79 thereby changing the degree of spring bias exerted upon the contact member 85 of the inner section. Thus in this modification the spring assembly member 82 bears against the intermediate channel portion 79 and it is adjusted in position relative to the intermediate channel in a manner similar to the arrangement shown and described in connection with Figures 2, 3 and 4.

In the arrangement shown in Figure 13 it will become apparent that the rocker portions 86 of the leaf spring retainer member 82 space the ends of the springs 83 and 84 a short distance away from the inner surface of the channel like portion of the intermediate arm section 79, thus permitting the outer arm section 81 to be located within this space. This in turn permits the arm to be extended over a wider range than would be the case if this space were not provided. Thus in this arrangement the same advantage of wide application of the arm for replacement purposes is obtained as was set forth in connection with the embodiment shown in Figure 2.

The outer end of the intermediate section 79 is of channel formation having a portion tapered inwardly to form a guide for the outer section 81. In order that the outer section 81 may be readily adjusted to any desired position and retained in such adjusted position there is provided, as is shown in Figure 14, which is an enlarged view of the portion XIV of intermediate section 79 of Figure 13, in the guide portion of the intermediate section 79 a split-sleeve bearing member 90 which substantially surrounds the outer section 79. The under portion of the split-sleeve bearing member 90 is of such configuration as to be fitted between two sets of inwardly formed portions 91 and 92 of the channel like portion of the intermediate section 79. Another inwardly bent portion 93 of the intermediate channel section 79 supports in position a leaf spring 94 which bears against the underside of the split-sleeve bearing member 90 thereby applying a bias to frictionally retain in position the outer section 81.

While two embodiments of arrangement for retaining in position the intermediate and outer sections of an arm have been shown, still another arrangement such as shown in Figure 15 may be employed. In this arrangement the intermediate arm section 95 is provided with an inwardly bent portion 96 of the channel which supports a locking member 97. The outer section of the arm 98 is located between the inner surface of the intermediate section 95 and the top surface of the locking member 97. The locking member 97 is formed so as to have stop members 99 at each end, and intermediate these end portions the locking member has surfaces arranged at angles to each other so that when the locking member 97 is moved outwardly toward the arm it acts as a locking wedge.

In Figure 16 there is shown a modification of the structure of an inner section of a windshield wiper arm. In this modification the inner section 100 is formed of material having sufficient flexibility so that this inner section may combine the functions of an inner section and a locking band such as shown at 73 in Figure 10. A portion of the inner section 100 serves as a cap and extending from the top of the cap are channel like members 101 and 102 which may be drawn together by a screw bolt 103. The remaining sections of the arm are pivotally attached to the inner section 100 by any suitable means. It will be apparent that this modification may be used to an advantage where a very economic manufacture is necessary.

No claim is made herein to that feature of the invention having to do with the connection between the wiper arm and the actuating shaft. That feature is disclosed and claimed in my divisional application Serial No. 470,035, filed December 24, 1942, for Windshied wiper.

While I have shown certain particular embodiments of my invention, it is to be understood that these are merely illustrated as to the principles disclosed. It will, of course, be understood that I do not wish to be limited thereto, since it is apparent that the principles herein disclosed are susceptible of numerous other applications and modifications may be made in the instrumentalities employed without departing from the spirit and scope of my invention as set forth in the appended claims.

What I claim as new and desire to secure by Letters Patent of the United States is:

1. A windshield wiper arm comprising an inner section, an outer section and an intermediate section, said inner section being adapted to be connected to a windshield wiper actuating mechanism, said intermediate section being pivotally mounted on said inner section, said outer section being mounted on and longitudinally adjustable with respect to said intermediate section, a multi-leaf spring assembly mounted on said intermediate section, a portion of said assembly bearing against said inner section to bias the remainder of said arm about said pivot, a split-sleeve bearing member for said outer section mounted adjacent one end of said intermediate section, another portion of said spring assembly being adapted to retain in position said bearing member and to apply a spring bias thereto to retain frictionally the adjusted relation between said outer section and said intermediate section.

2. A windshield wiper arm comprising an inner section, an outer section and an intermediate section, said inner section being adapted to be connected to a windshield wiper actuating mechanism operatively related to a windshield, said intermediate section being pivotally mounted on said inner section, said outer section being mounted on and longitudinally adjustable with respect to said intermediate section, a leaf spring assembly mounted on said intermediate section, said assembly including a leaf spring having adjacent the end thereof two surfaces at angles to each other for selective engagement with a portion of said inner section to bias said other sections away from or toward the windshield, a second leaf spring having a portion reinforcing the bias action of said first leaf spring and another portion for applying a bias to said outer section to hold it in longitudinally adjusted position, a retainer for said leaf spring members having a channel therefore and an inwardly turned portion clamping said springs in position, said retainer having a rocker portion engaging said intermediate section of said arm, and a screw member mounted on said intermediate section and engaging said spring retainer for adjusting the position thereof relative to said section to determine the degree of bias to be applied by said spring assembly to said inner section.

3. A windshield wiper arm comprising a plurality of sections, one of which is adapted to be connected to the actuating shaft of a windshield wiper mechanism operatively related to a windshield, a contact member mounted adjacent one end of said section, a second section pivotally mounted on said first section, a plurality of leaf spring members, a retainer for said spring members, said retainer being provided with a rocker portion engaging said second section, said retainer being mounted on said second section so that at least one of said spring members engages said contact member to bias said second section about said pivot point, one of said spring members being provided adjacent the free end thereof with a plurality of surfaces at angles to each other for determining the direction of the bias to be exerted to tend to cause said section to move toward or away from the windshield, and means for adjusting the position of said retainer relative to said second section thereby to control the degree of bias exerted by said spring members.

4. A windshield wiper arm comprising a plurality of sections, one of which is adapted to be connected to the actuating shaft of a windshield wiper mechanism, a second section pivotally mounted on said first section, and spring means associated with said second section and engaging said first section to bias said second section pivotally about said first section, said spring means being mounted on a member having a rocker engaging said second section, and means mounted on said second section for adjustably determining the position of the said member relative to said second section thereby to control the degree of bias exerted by said spring means.

5. A multi-section windshield wiper arm having one section adapted to engage the actuating member of a windshield wiper mechanism, a contact member carried by said section adjacent to the end thereof, the second section pivotally mounted on said first section at a point further from the end thereof than said contact member, and an adjustably positioned leaf spring assembly comprising a spring and a lever member adjustably carried by said second section, said spring engaging said contact member to bias said second section about said pivot, and adjustable means mounted on said second section and engaging said lever member for predetermining the position of said spring assembly relative to said second section for determining degree of bias exerted by said leaf spring assembly.

6. A windshield wiper arm comprising a plurality of sections, one of which is adapted to be connected to the actuating shaft of a windshield wiper mechanism, a second section pivotally mounted on said first section, a leaf spring associated with said second section and engaging said first section to bias said second section pivotally thereabout, said spring being mounted on a member having a rocker engaging said second section, and adjustable screw means for selectively positioning said member relative to said section to determine the degree of bias to be exerted by said spring.

7. A windshield wiper arm comprising an inner section, an outer section, and an intermediate section, said intermediate section being pivotally mounted on said inner section, a leaf spring, a retainer therefore, said retainer being provided with a rocker portion for engaging the inner surface of said intermediate section, said retainer being mounted thereon in spaced apart relation thereto and so that said spring engages said inner section to bias said arm about the pivot thereof, said outer section being mounted on and longitudinally adjustable with respect to said intermediate section, a portion of said outer section in one position being located between said inner surface of said intermediate section and said retainer, and means for adusting the position of said retainer to vary the bias exerted by said spring.

8. A windshield wiper arm comprising an inner section, an outer section and an intermediate section, said intermediate section being pivotally supported upon said inner section, a spring assembly comprising a leaf spring means supported by a retainer, said retainer being provided with a rocker portion for engaging the inner surface of said intermediate section, said retainer being mounted on said section in spaced apart relation thereto and so that a portion of said spring assesmbly engages said inner section to bias said arm about the pivot thereof, said outer section being mounted on and longitudinally adjustable with respect to said intermediate section, a portion of said outer section in one adjusted position being located between the inner surface of said intermediate section and said retainer, another portion of said spring assembly being adapted to apply a bias to said outer section to retain it frictionally in adjusted position relative to said intermediate section, and means for adjusting the position of said retainer relative to said intermediate section thereby to vary the bias exerted by said spring means between said sections about said inner section pivot.

9. A windshield wiper arm comprising a plurality of sections including an outer section mounted on and longitudinally movable with respect to another of said sections, said other section being of channel formation having one end tapered inwardly to form a guide for said outer section, a bearing member mounted within said guide and between said sections, said bearing member having a depending lug attached thereto, and a leaf spring mounted upon said other section for applying a bias to said bearing member to retain frictionally the sections in adjusted relation, said leaf spring being provided with an aperture adjacent one end for receiving the lug of said bearing member thereby to retain said member in proper operative position relative to said sections.

10. A windshield wiper arm comprising a plurality of sections, the first of which is an inner section adapted to be connected to the actuating shaft of a windshield wiper mechanism forwardly of a windshield, and the second of which is a next outer section pivotally mounted on said first section, a leaf spring supported by said second section and engaging at its inner end with the first section to bias said second section pivotally thereabout in a rearward direction, a movable member united with the spring at the outer end of the spring and extending inward from the region of union toward the inner free end of the spring and normally in substantially parallel relation to said spring, and adjusting means supported by said second wiper arm section near the inner end thereof and adjustably connecting said section with said movable member, said adjusting means being operable to adjust and fix the position of said movable member relative to said second section and thereby to determine the degree of bias to be exerted by said leaf spring.

11. A windshield wiper arm comprising a plurality of sections, the first of which is an inner section adapted to be connected forwardly of a windshield to the actuating shaft of a windshield wiper mechanism, and the second of which is a next outer section pivotally mounted on said first section, leaf spring means carried by said second section and having an inner end portion thereof engaged with said first section to bias said second section pivotally with relation to said first section in a rearward direction, an elongated member carried by the second section and disposed to extend lengthwise thereof, said member being connected at its inner end to the second wiper arm section, and united at its outer end to an outer end portion of said spring means, but being separable from the spring means throughout the major portion of its length through spring flexure, and adjusting means mounted on said second section adjacent the first and connected to said elongated member near the inner end thereof for effecting the connection of the inner end of the elongated member to said second section, and for adjustably determining and fixing the position of said elongated member relative to said second section, thereby to control the degree of bias exerted by said spring means.

12. A windshield wiper arm comprising a plurality of sections, the first of which is an inner section adapted to be connected forwardly of a windshield to the actuating shaft of a windshield wiper mechanism, a second section pivotally mounted on said first section, a leaf spring unit carried by said second section to bias said second section pivotally with relation to said first section in a rearward direction, said leaf spring unit including a leaf spring, and a member angularly movable with relation to said second section, said spring and said movable member being united in V-shaped relationship with the arms of the V extending inward from the V base toward the first section, the leaf spring engaging with the first section, and the movable member terminating short of engagement therewith, and adjusting means mounted on said second section adjacent the first and connected to said movable member for adjustably determining and fixing the position of said movable member relative to said second section, thereby to control the degree of bias exerted by said spring means.

13. A windshield wiper arm comprising a plurality of sections, the first of which is an inner section adapted to be connected to the actuating shaft of a windshield wiper mechanism forwardly of a windshield, and the second of which is a next outer section pivotally mounted on said first section, leaf spring means associated with said second section to bias said second section pivotally about said first section in a rearward direction, said spring means being angularly movable with relation to said second section and including two united but diverging portions, which extend inward from the region of union toward the first section, one behind the other, the rear one of which engages said first section from behind, and adjusting means mounted on the second wiper arm section near the inner end thereof and connected to the forward portion of said spring means for adjustably determining and fixing the position of said spring means relative to said second section, thereby to control the degree of spring bias to be exerted.

14. A windshield wiper arm comprising a plurality of sections, one of which is adapted to be connected to the actuating shaft of a windshield wiper mechanism, a second section pivotally mounted on said first section and leaf spring means associated with said second section to bias said section pivotally about said first section, said spring means including a leaf spring member, a retainer for said spring member, said retainer being provided with a member secured to said second section at a point remote from the free end of said leaf spring member, and means mounted on said second section for engagement with said spring retainer adjacent the end thereof which is in the proximity of the free end of said leaf spring member, said means operating to adjustably determine the position of said retainer member relative to said second section thereby to control the degree of bias exerted by the free end of said spring member upon said first section.

15. In a windshield wiper, in combination, an inner first section adapted to be affixed to an operating shaft forwardly of a windshield, a next outer second section pivotally mounted on the first for movement about an axis transverse to the shaft axis, said first section including an abutment; and said second section including a front body member, a resilient flexible lever behind said front body member having front and rear lever arms disposed in sharply acute relation to one another, the vertex portion of said lever constituting the outer end portion of the lever, the rear lever arm bearing at the inner free end thereof against the abutment of the first section, and adjusting means connecting the inner free end of the forward lever arm with an inner end portion of the second wiper arm section and operable to force said forward arm progressively forward toward said front body member notwithstanding the obstruction offered by the abutment to approach of the rear lever arm toward said front body member.

16. In a windshield wiper, in combination, a first, inner arm section adapted to be affixed forwardly of a windshield to an operating shaft, a second next outer wiper arm section pivotally mounted on the first for movement about an axis transverse to the shaft axis, said inner section including an abutment portion, and said second arm section including a front body member, a spring unit carried by the second arm section, said spring unit comprising a forward leg and a rear leg, united to one another through their outer ends but separable by virtue of spring flexure throughout at least the major portion of their lengths, the inner end of the rear leg engaging the abutment member of the inner wiper arm section from the rear and being limited in its approach toward the front body member of the second wiper arm section by its engagement with said abutment, and adjusting means operatively connecting the inner end of the forward leg with an inner end portion of the second wiper arm section and operable to force the free inner end of the forward leg progressively toward said front body member, notwithstanding the obstruction offered by the abutment to approach of the inner end of the rear leg toward the front body member of the second wiper arm section, thereby to increase the separation of the forward and rear legs against an increasing spring resistance as the forward leg is adjusted forward toward the front body member, and so to increase the bias of the second wiper arm section in a rearward direction.

17. In a windshield wiper, in combination, a first, inner arm section adapted to be affixed forwardly of a windshield to an operating shaft, a second next outer wiper arm section pivotally mounted on the first for movement about an axis transverse to the shaft axis, said inner section including an abutment portion, and said second arm section including a front body member, a spring unit carried by the second arm section, said spring unit comprising a forward leg and a rear leg, united to one another through their outer ends but separable by virtue of spring flexure throughout at least the major portion of their lengths, the inner end of the rear leg engaging the abutment member of the inner wiper arm section from the rear and being limited in its approach toward the front body member of the second wiper arm section by its engagement with said abutment, and a headed screw having the stem portion thereof passed rearwardly freely through an inner end portion of said front body member of the second wiper arm section and threaded through the inner end of the forward leg of the spring unit, said screw being operable from the front of the wiper with the wiper fully assembled and in operative position to draw the free end of the forward leg progressively toward said body member notwithstanding the obstruction offered by the abutment to approach of the inner end of the rear leg toward the front body member of the second wiper arm section, thereby to increase the separation of the forward and rear legs of the spring unit against an increasing spring resistance as the forward leg is adjusted forward toward the front body member, and so to increase the bias of the second wiper arm section toward the windshield.

18. In a windshield wiper, in combination, a first, inner arm section adapted to be affixed forwardly of a windshield to an operating shaft, a second next outer wiper arm section pivotally mounted on the first for movement about an axis transverse to the shaft axis, said first section including an abutment portion, and said second arm section including a front body member, a spring unit carried by the second arm section, said spring unit comprising a forward rigid leg and a rear leg in the form of a multiple-leaf spring, said legs united to one another through their outer ends but separable by virtue of spring flexure throughout at least the major portion of their lengths, the inner end of the rear leg engaging the abutment member of the inner wiper arm section from the rear and being limited in its approach toward the front body member of the second wiper arm section by its engagement with said abutment, and a headed screw having the stem portion thereof passed rearwardly freely through an inner end portion of said front body member of the second wiper arm section and threaded through the inner end of the forward leg of the spring unit, said screw being operable from the front of the wiper with the wiper fully assembled and in operative position to draw the free end of the forward leg progressively toward said front body member notwithstanding the obstruction offered by the abutment to approach of the inner end of the rear leg toward the front body member of the second wiper arm section, thereby to increase the separation of the forward and rear legs of the spring unit against an increasing spring resistance as the forward leg is adjusted forward toward the front body member, and so to increase the bias of the second wiper arm section toward the windshield.

19. In a windshield wiper, in combination, a first inner arm section adapted to be affixed forwardly of a windshield to an operating shaft, a second next outer wiper arm section pivotally mounted on the first for movement about an axis transverse to the shaft axis, said inner section including an abutment portion, and said second arm section including a front body member, a spring unit carried by the second arm section, said spring unit comprising a forward leg and a rear leg, united to one another through their outer ends but separable by virtue of spring flexure throughout at least the major portion of their lengths, the inner end of the rear leg engaging the abutment member of the inner wiper arm section from the rear and being limited in its approach toward the front body member of the second wiper arm section by its engagement with said abutment, a third wiper arm section mounted for lengthwise sliding adjustment on the second wiper arm section immediately behind the front body member and between said member and the spring unit, and adjusting means operatively connecting the forward leg of the spring unit with an inner end portion of the front body member of the second wiper arm section at a point located inward beyond the range of movement of the third wiper arm section and operable to force the free end of the forward leg progressively toward said front body member, notwithstanding the obstruction offered by the abutment to approach of the inner end of the rear leg toward the front body member, thereby to increase the separation of the forward and rear legs against an increasing spring resistance as the forward leg is adjusted forward toward the front body member, and so to increase the bias of the outer wiper arm section toward the windshield.

20. In a windshield wiper arm, in combination, an inner rigid section adapted to be secured to an operating shaft, a second rigid section pivoted upon said inner section, a spring carried by one of said sections behind the front thereof and engaging the other of said sections, said spring being adapted to urge said second section toward the windshield, an adjusting member supported upon, and extending through the front of, one of said sections, and readily accessible from the front of said section for adjusting operation when the arm is installed and in operative position, and an adjustment transmitting member adjustably carried on the same section by which the adjusting member is supported, behind the front thereof, said adjustment transmitting member having force transmitting connection at one point to the adjusting member and at another to the spring, and serving when adjusted in position by the adjusting member to alter the stress of the spring and thereby to adjust the force with which the spring urges the second section toward the windshield.

THEODORE J. SMULSKI.